Figure 1:
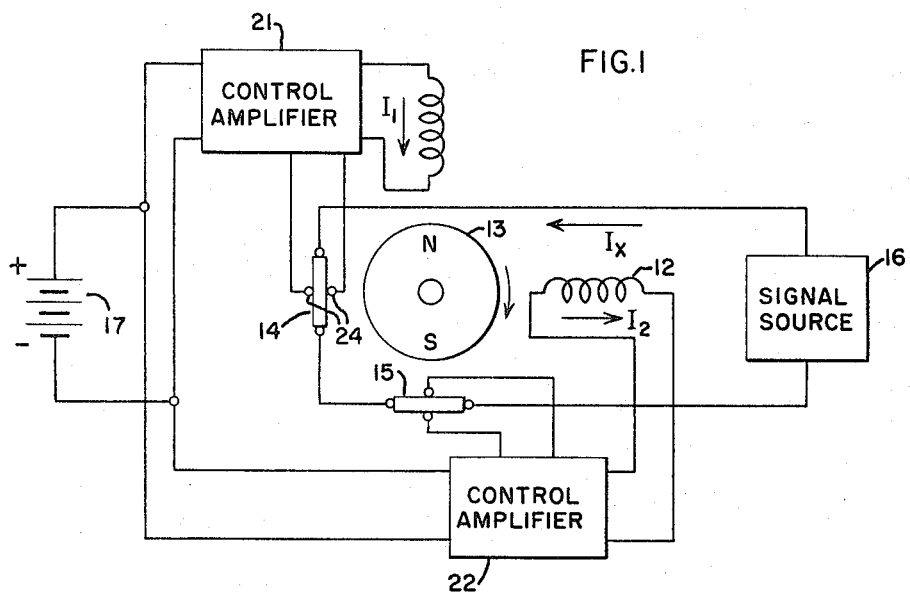

May 14, 1968  E. W. MANTEUFFEL  3,383,574
BRUSHLESS DIRECT CURRENT MOTOR AND TORQUER
Filed June 30, 1964  2 Sheets-Sheet 1

United States Patent Office

3,383,574
Patented May 14, 1968

3,383,574
BRUSHLESS DIRECT CURRENT MOTOR
AND TORQUER
Erich W. Manteuffel, Vestal, N.Y., assignor to General
Electric Company, a corporation of New York
Filed June 30, 1964, Ser. No. 379,150
7 Claims. (Cl. 318—138)

This invention relates to electric motors, and more particularly relates to a motor adapted to be energized from a direct current source which requires no mechanical commutator. It is an improvement over the brushless D-C motors disclosed in patent application Ser. No. 159,539, filed Dec. 15, 1961 by Erich W. Manteuffel, "Direct Current Motor," now Patent No. 3,159,777, issued Dec. 1, 1964, and patent application Ser. No. 188,-439, filed Apr. 18, 1962, by George Kovatch and Erich W. Manteuffel, "Direct Current Motor," now Patent No. 3,165,685, issued Jan. 12, 1965. The invention described herein was made in the performance of work under a NASA contract and is subject to the provisions of Section 305 of the National Aeronautics and Space Act of 1958, Public Law 85–568 (72 Stat. 435; 42 U.S.C. 2457).

In these patent applications, the motors used silicon controlled rectifiers as switching elements and Hall generators as rotor position sensors. The Hall generators were energized with repetitive pulse currents of relatively large magnitude and were capable of controlling silicon controlled rectifiers either directly or by means of small pulse transformers.

The total number of switching silicon controlled rectifiers, which in essence corresponds to the number of commutator bars in a D-C motor, is limited in order to make the motor practically feasible. Thus, rather abrupt switching of the armature field, essentially in a stepwise fashion cannot be avoided. Also, variations in torque magnitude occur as the rotor moves through 360° of rotation. This is of less importance in a fast running motor but is not desirable for achievement of a fixed stall torque regardless of rotor position, such as is required in certain types of torque-motors. With regard to speed and torque regulation, the motors of this type required a separate control power amplifier in order to change the input voltage continuously as required by operational conditions.

Accordingly, it is an object of the invention to provide a D-C motor in which there is constant torque, regardless of rotor position.

It is a further object of the invention to provide a brushless D-C motor in which abrupt commutation is eliminated, thereby minimizing transient currents and voltages which reduce overall efficiency.

It is another object of the invention to provide a brushless D-C motor which does not require a separate D-C supply voltage control as with prior motors having commutators.

It is another object of the invention to provide a brushless D-C motor which is readily adapted to synchronous motor operation.

Briefly stated, in accordance with certain aspects of the invention, a brushless D-C motor is provided which utilizes two Hall effect generators which generate signals in accordance with the angular position of a permanent magnet motor rotor and control the current applied to respective motor stator windings so that the resulting torque is constant through 360° of rotor rotation. This is achieved by varying the currents to armature field-producing windings, electrically displaced by 90°, with appropriate phase differentials so that the resultant stator field maintains a constant magnitude and maintains a constant angular orientation relative to the rotor orientation. As the rotor rotates, the Hall generator signals vary sinusoidally and produce winding currents which carry proportionately. The vector sum of the resulting fields is a rotating field vector which rotates with the motor.

The invention, together with further objects and advantages thereof, may best be understood by referring to the following description taken in conjunction with the appended drawings in which like numerals indicate like parts and in which:

FIGURE 1 is a schematic illustration of a first embodiment of the invention.

FIGURE 2 and FIGURES 2a–d are diagrams illustrating the operation of the FIGURE 1 motor.

Figure 3:
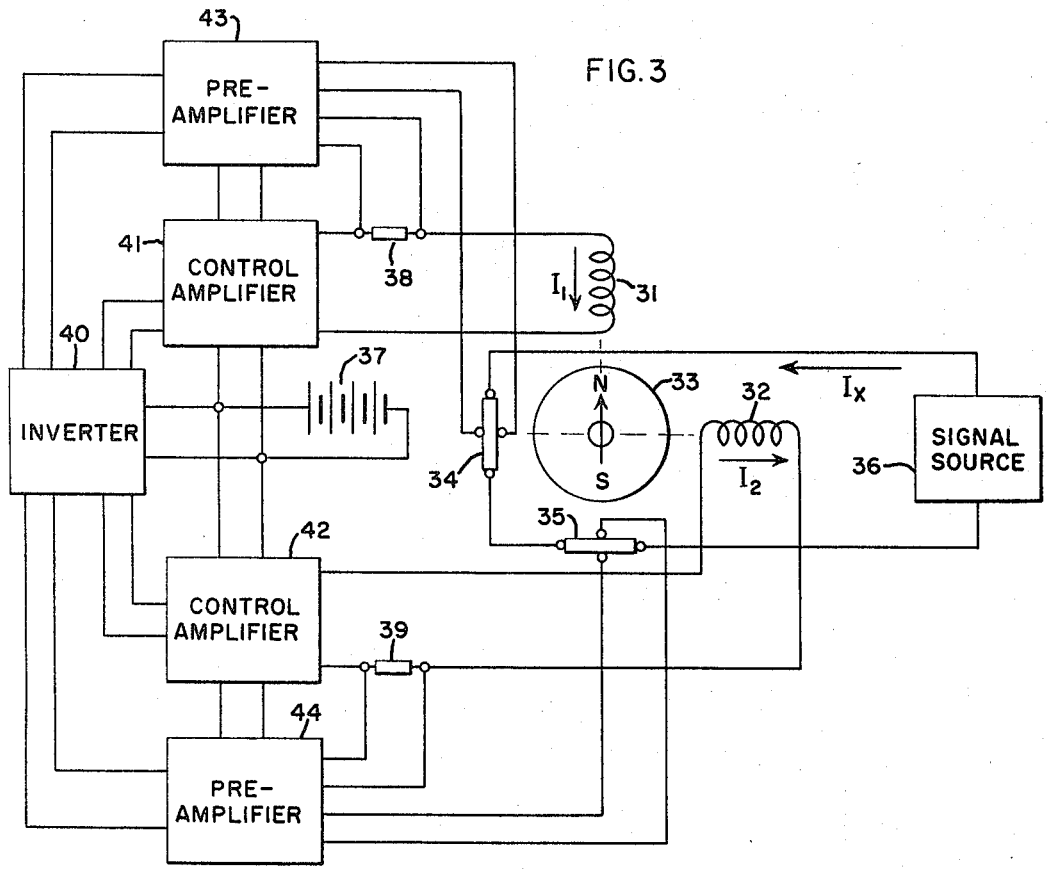

FIGURE 3 is a schematic illustration of a second embodiment of the invention.

In FIGURE 1, two armature windings 11 and 12, electrically displaced by 90°, are positioned in a stator in torque producing relation with a permanent magnet rotor 13. The rotor and windings are shown for a two pole motor but multiple arrangements can also be employed as in any common D-C or A-C motor. Two Hall generators 14 and 15, also electrically displaced by 90°, are positioned in a fixed relation to the stator windings 11 and 12, respectively, and in magnetic relation to the permanent magnet rotor 13 so as to sense the magnitude of the rotor flux density as a sinusoidal function of angular position of the rotor. The angular position intelligence is fed to linear time-ratio control amplifiers of a bridge type internal circuit arrangement, designated in FIGURE 1 as control amplifiers 21 and 22. Both time-ratio control amplifiers are fed from a common D-C supply source 17. These amplifiers control current flow within the two armature windings 11 and 12 in such a manner as to produce a constant torque having a magnitude and direction proportional to the output magnitude of an external signal source 16 which serves to energize the Hall generators 14 and 15. By constant torque it is meant that there is a constant magnitude regardless of rotor angular position. The instantaneous magnitude of this torque is given by the expression:

$$T = K \cdot \phi_R \cdot F_A \sin \theta$$

where $T$ = torque acting upon the rotor
$K$ = a constant
$\phi_R$ = magnitude of the permanent magnet rotor flux
$F_A$ = resultant armature field
$\theta$ = instantaneous angular displacement between $F_A$ and $\phi_R$ If the magnitude of $F_A$ is held constant and if angle $\theta$ is maintained at 90°, the torque will be constant and maximum regardless of rotor position.

In the rotor position shown in FIGURE 1, Hall generator 14 has zero output voltage at its Hall terminals 24 while Hall generator 15 is at its maximum output. Consequently, no current flows in winding 11, while maximum current $I_2$ exists in winding 12, shown arbitrarily as an arrow pointing to the right. It is assumed that an energizing current $I_X$ is furnished to the Hall elements from the signal source 16. The rotor 13 will, therefore, experience a clockwise torque. As it starts to turn in a clockwise direction, current $I_2$ will decrease, while current $I_1$ will gradually increase in a direction as indicated by the arrow pointing downwards. The Hall terminal voltages will essentially vary in sinusoidal and cosinusoidal fashions respectively as the rotor 13 rotates and so will the currents $I_1$ and $I_2$ in the armature windings. Therefore, the combined armature field vector will be of constant magnitude and will be displaced against the rotor-flux vector by 90° at all times.

Figure 2:
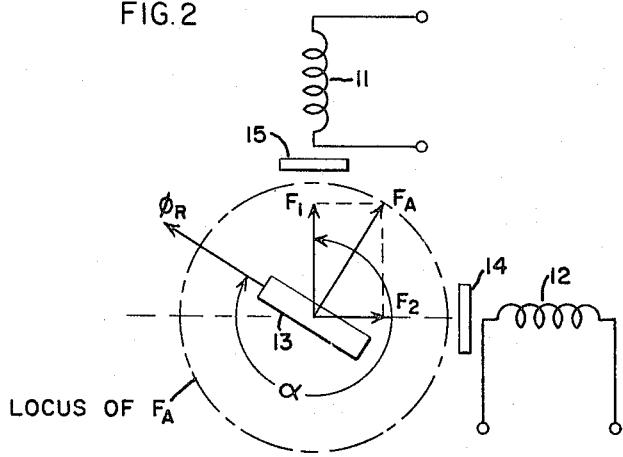
Figure 2A:
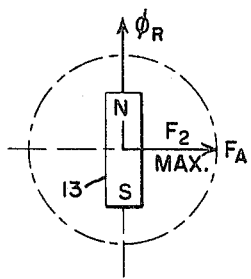

FIGURE 2 illustrates in somewhat more detail the vectorial relationship between rotor-flux $\phi_R$ and the resultant armature field $F_A$ as the rotor rotates. For simplicity, the rotor is shown as a simple bar-magnet. Vectors $F_1$ and $F_2$ represent the fields of armature windings 11 and 12, respectively, and the resultant armature field, $F_A$, is the vectorial sum of $F_1$ and $F_2$. Hall element 14 controls current in winding 11 while Hall element 15 controls current in winding 12. With zero rotor position, as shown in FIGURE 1, the Hall voltages of Hall generators 14 and 15 may be expressed as follows:

$$V_{H_4} = R_H \frac{B \cdot \sin \alpha \cdot I_X}{\delta}$$

(for the case of clockwise rotation)

$$V_{H_5} = R_H \frac{B \cdot \cos \alpha \cdot I_X}{\delta}$$

where $R_H$ = Hall constant
$B$ = Maximum density of flux penetrating the Hall generators
$\alpha$ = Rotor position angles relative to Hall element 15
$I_X$ = Energizing current flowing through Hall generators
$\delta$ = Thickness of Hall generator element The currents in windings 11 and 12 are then given by:

$$I_1 = G \cdot V_{H_4} \text{ and } I_2 G \cdot V_{H_5}$$

where G = gain of either time-ratio control amplifier. Gains of both amplifiers 21 and 22 as well as the Hall constants of both Hall generators 14 and 15 are made practically equal.

Figure 2B:
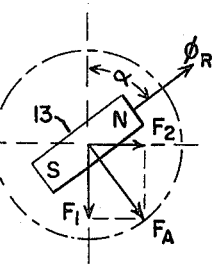
Figure 2C:
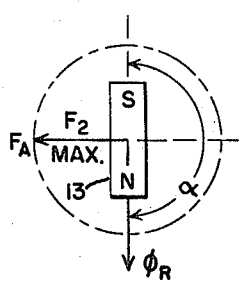
Figure 2D:
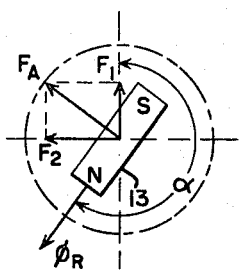

When the rotor is at the zero degree position (FIGURE 2a), $F_2$ is at its maximum and $F_1$ is equal to zero. The resultant armature field $F_A$ is equal in magnitude and direction to $F_2$ maximum. As the rotor 13 rotates in a clockwise direction, the magnitude of $F_1$ increases sinusoidally, reaching its maximum value when the rotor position $\alpha = 90°$ and returning to zero at a rotor position of $\alpha = 180°$. At the same time, $F_2$ is decreasing cosinusoidally, passing through zero magnitude and reversing direction as the rotor passes through the 90° position. Its magnitude then increases to a maximum again at a rotor position of 180° (FIGURE 2c). Similarly, as the rotor rotates from 180° to 0°, the magnitude of $F_1$ increases to a maximum at 270° and returns to zero at a rotor position of $360° = 0°$, while simultaneously the magnitude of $F_2$ changes cosinusoidally from a maximum to zero and back to a maximum. FIGURES 2b and 2d show two intermediate positions arbitrarily chosen. In every instant $F_A$ is of constant magnitude and orthogonal to $\phi_R$. To reverse the direction of torque, only the direction of the Hall generator energizing current $I_X$ need be reversed. The magnitude of the torque is directly proportional to the magnitude of current $I_X$ within the linear region of the transfer characteristic of the time-ratio control amplifiers 21 and 22. A discussion of these amplifiers is not considered necessary here, since their principle of operation is described in various publications, especially by R. E. Morgan in the Proceedings of the International Conference and Exhibit on Aerospace Electrotechnology, Phoenix, Ariz., April 1964, pp. 993–997, "Bridge-Chopper Inverter for 400 c.p.s. Sine Wave Power" (FIGURE 14).

FIGURE 3 shows a circuit arrangement which provides improved linearity of torque versus signal current $I_X$ compared with the scheme of FIGURE 1. Each Hall generator 34 and 35 furnishes a voltage which is a function of the position of rotor 33. In the circuit of FIGURE 3, these voltages are fed to preamplifiers 43 and 44, respectively. Feedback is provided by current sensing means 38 and 39, such as resistors furnishing voltages to preamplifiers 43 and 44 proportional to the actual currents flowing in armature windings 31 and 32, respectively. The difference signals derived are amplified in preamplifiers 43 and 44 in order to provide sufficient drive to time ratio control amplifiers 41 and 42 controlling the armature currents in windings 31 and 32 in such a manner as to keep angle $\theta$ constant. The inverter 40 in FIGURE 3 operating from a D-C source 37 is a small, conventional "Royer-Type" inverter that provides power to the preamplifiers and determines the chopping rate of the time-ratio control amplifiers 41 and 42. The speed versus torque characteristic of this brushless motor, as shown in FIGURE 1, is that of a D-C shunt field motor. The circuit of FIGURE 3 permits acceleration of a load at constant torque, which often is desirable.

The motor lends itself to operation as a 2-phase synchronous motor which is a unique combination of a D-C motor and a synchronous motor. At attainment of a certain, so-called synchronous speed, the signals furnished from the Hall detectors 14 and 15, or in case of FIGURE 3, furnished from the preamplifiers 43 and 44, can be disconnected and the control amplifiers driven by means of a fixed frequency signal corresponding to that synchronous speed. The rotor will then fall in step with the rotating armature field created by the 2-phase winding arrangement and a small angular displacement between armature field vector $F_A$ and rotor flux vector $\phi_R$, whose angular value depends on the load torque, will exist as in any common synchronous motor. Return to D-C motor operation is possible, if torque and speed control by means of the Hall detectors is re-established. This switch-over from one mode of operation to the other can naturally be accomplished solely by solid state means.

The embodiments of FIGURES 1 and 3 both employ time-ratio control amplifiers (21 and 22, and 41 and 42). These control amplifiers perform the function of linear amplifiers which apply power to the stator windings. Therefore, there are numerous amplifiers which can be substituted. However, the time-ratio control amplifiers are strongly preferred primarly because their efficiency is far superior to conventional semiconductor and tube amplifiers. Also, the time-ratio control amplifiers are very well suited to this application which has inductive loads and which benefits from the isolation of the input signals present in time-ratio control amplifiers.

Both embodiments employ a permanent magnet rotor and Hall generators for producing an input control voltage for the time-ratio control amplifiers as a sinusoidal and cosinusoidal function of rotor position. It is essential for operation without ripple that the stator winding current vary sinusoidally with rotor rotation in an essentially continuous manner. Hall generators are best suited for the devices of FIGURES 1 and 3 because they are brushless, having no frictional contact with the rotor and in addition to sensing rotor position they inherently introduce the required sine function. Other devices, such as saturable reactor or photoelectric devices, have heretofore been relatively too large or complex for practical employment in a D-C motor and torquer. The Hall generators can be of the slab type, of indium-antimonide or indium-arsenide; but thin-film indium-arsenide deposited on a ferrite substrate, for concentrating the flux, is preferred for its greater efficiency and heat dissipation characteristic. Conveniently, the Hall generators are positioned in slots in the stator in the flux return path and secured by epoxy. Temperature dependence is substantially reduced by operating with impressed voltage rather than energizing with enforced current. While in both FIGURES 1 and 3, a single permanent magnet rotor is shown, a separate rotor can be used for the Hall generators if desired. The output of the Hall generators will, of course, be dependent upon the energizing signals from signal sources 16 and 36 in FIGURES 1 and 3 respectively. An important feature of the invention is the simplicity of this arrangement whereby the D-C motor and torquer has its torque magnitude and direction controlled by an input D-C or A-C signal level. With a conventional D-C control signal generator, the D-C signal is applied directly to the Hall generators in series or in parallel and the operation will be independent of instantaneous rotor position.

While particular embodiments of the invention have been shown and described herein, it is not intended that the invention be limited to such disclosure, but that changes and modifications can be made and incorporated within the scope of the claims.

What is claimed is:

1. An electric motor energizable from a source of unidirectional potential which comprises:
   (a) a rotor having magnetic poles of opposite polarity thereon;
   (b) a stator member having a pair of flux-producing windings positioned in torque-producing relation with said rotor;
   (c) a pair of Hall generators positioned in flux-sensing relationship to said magnetic poles;
   (d) linear control amplifier means for applying continuous currents to said stator windings;
   (e) means connecting each of said Hall effect generators to the control amplifier means in such a manner that each of said Hall generators supplies a control signal to said control amplifier means to energize said windings and produce a constant driving torque on said rotor by producing winding currents which are respectively sine and cosine functions of said rotor position; and
   (f) means including electric signal means for supplying control of the magnitude of the constant driving torque to said linear control amplifier means.

2. An electric motor energizable from a source of unidirectional potential which comprises:
   (a) a rotor having first and second magnetic poles of opposite polarity;
   (b) a stator member having first and second flux-producing windings positioned in torque-producing relation with said rotor;
   (c) first and second generator means positioned to sense the angular position of said rotor in such a manner that each generator produces a signal representing the position of said rotor relative to a respective stator winding; and
   (d) linear time ratio control amplifier means for applying continuous currents to said stator windings, in response to said generator means, in such a manner that the winding currents are sine and cosine functions of said rotor position and produce a constant driving torque on said rotor.

3. A D-C motor and torquer comprising:
   (a) a rotor having at least one pair of magnetic poles;
   (b) a stator having at least one pair of armature windings electrically displaced by 90° relative to said rotor poles;
   (c) a pair of signal generators positioned in fixed relation to said stator with an angular displacement corresponding to an electrical displacement between said rotor magnetic poles of 90°, and adapted to generate signals proportional to sine and cosine functions of rotor angular displacement;
   (d) means for applying continuous currents to respective said stator windings which are linearly proportional to said respective sine and cosine generator signals to produce a constant torque for a given amplitude of the generator signals; and
   (f) means including electric signal means for supplying control of the magnitude of the constant driving torque to said means for applying continuous currents.

4. A D-C motor and torquer comprising:
   (a) a rotor having at least one pair of permanent magnetic poles;
   (b) a stator having at least one pair of armature windings electrically displaced by 90° relative to said rotor poles;
   (c) a single pair of Hall generators positioned in fixed relation to said stator, with an electrical displacement of 90° between the generators, and in a magnetic relation to said rotor so as to sense the magnitude of the rotor flux density as a function of rotor angular position, each of said generators having a position about said rotor which is substantially aligned with the axis of one of said armature windings which is controlled by the other of said generators;
   (d) a pair of linear time-ratio control amplifiers for controlling continuous current flow in said respective armature windings in accordance with the rotor position signals from respective said Hall generators to produce a constant torque having a magnitude proportional to an external signal energizing said Hall generators.

5. The D-C motor and torquer of claim 4 further comprising:
   (e) a source of D-C signals for energizing said Hall generators and controlling the magnitude of the motor torque;
   (f) means securing said Hall generators in the flux return path of said rotor whereby the generator signals vary sinusoidally with rotor rotation.

6. An electric motor energizable from a source of unidirectional potential which comprises:
   (a) a rotor having magnetic poles of opposite polarity thereon;
   (b) a stator member having a pair of flux-producing windings electrically displaced by 90° and positioned in said stator member in torque-producing relation with said rotor;
   (c) a pair of linear control amplifiers, each having input control means, and each of said amplifiers being connected in circuit with one of said windings to control the flow of current through a respective one of said windings from a source of unidirectional potential so that continuous sinusoidal current will flow in each of said windings in accordance with the signal applied to the control means;
   (d) a pair of Hall generators positioned in flux-sensing relationship to said magnetic poles and electrically displaced by 90°;
   (e) means for applying torque magnitude control current to said Hall effect generators which are energized thereby;
   (f) means connecting each of said Hall generators to the input control means of a respective one of said amplifiers whereby each of said Hall generators applies a signal to the input control means of a respective amplifier which is a sine function of said rotor position in such a manner that the vectorial sum of the resultant winding produced fields is of constant magnitude and has a direction which is always displaced by a constant angle from said rotor poles.

7. The D-C motor and torquer of claim 6 further comprising:
   (e) means to sense the current in respective said stator windings;
   (f) preamplifier means responsive to respective said Hall generators and respective said stator current sensing means for controlling said control amplifiers to maintain the angle between the rotor position and the resultant field constant.

(References on following page)

References Cited

UNITED STATES PATENTS

| | | | |
|---|---|---|---|
| 2,582,271 | 1/1952 | Page | 328—27 |
| 2,936,420 | 5/1960 | Tyler | 328—27 |
| 3,210,631 | 10/1965 | Niccolls | 318—138 |
| 2,512,325 | 6/1950 | Hansen | 310—10 |
| 2,536,805 | 1/1951 | Hansen | 310—10 |
| 3,023,348 | 2/1962 | Cox | 318—138 |
| 3,250,971 | 5/1966 | Brunner et al. | 318—138 |

FOREIGN PATENTS

| | | |
|---|---|---|
| 933,996 | 8/1963 | Great Britain. |

ORIS L. RADER, *Primary Examiner.*

G. SIMMONS, *Assistant Examiner*